(12) United States Patent
Liu et al.

(10) Patent No.: US 7,418,721 B2
(45) Date of Patent: Aug. 26, 2008

(54) APPARATUS FOR ALIGNING AND CLIPPING DIFFERENT SIZE COMPACT DISCS FOR DISC DEVICE

(75) Inventors: Chin-Sung Liu, Hsinchu (TW);
 Chia-Hao Ou, TaiChung Hsien (TW);
 Chun-Yao Wang, Hsinchu (TW)

(73) Assignee: TopRay Technologies Inc., Hsinchu (TW)

( * ) Notice: Subject to any disclaimer, the term of this patent is extended or adjusted under 35 U.S.C. 154(b) by 365 days.

(21) Appl. No.: 11/277,948

(22) Filed: Mar. 30, 2006

(65) Prior Publication Data

US 2007/0118845 A1    May 24, 2007

(30) Foreign Application Priority Data

Nov. 22, 2005    (TW) .............................. 94220199 U

(51) Int. Cl.
 *G11B 17/04*    (2006.01)
(52) U.S. Cl. ..................................... 720/604
(58) Field of Classification Search ................ 720/622, 720/706, 624, 675, 616, 606, 621, 704, 618, 720/620, 628, 604, 629, 630, 659, 672; 369/292, 369/194; 360/99.07, 99.06, 99.02
See application file for complete search history.

(56) References Cited

U.S. PATENT DOCUMENTS

| | | | | |
|---|---|---|---|---|
| 6,993,777 | B2* | 1/2006 | Kabasawa | 720/626 |
| 2007/0039011 | A1* | 2/2007 | Wu et al. | 720/604 |
| 2007/0107003 | A1* | 5/2007 | Liu et al. | 720/604 |
| 2008/0005754 | A1* | 1/2008 | Ariyoshi et al. | 720/629 |

\* cited by examiner

*Primary Examiner*—Allen T Cao

(57) ABSTRACT

An aligning and clipping apparatus for slot-in CD/DVD players/ROM to load different size discs is provided, including a base, a tray, at least two moveable clipping elements, at least two ejection elements, and an auxiliary clipping element. Two clipping elements are installed at the front end of the tray for loading and clipping the disc. The auxiliary clipping element is on the top of the base for improving the stability of the clipping. The ejection elements are at the two sides of the rear end of the tray for ejecting the clipping of the disc so that the disc is in the position for data reading and writing. To achieve the function for clipping different size discs, the moveable clipping elements are placed at a specific angle and a specific curvature. Therefore, the different size discs can be clipped and held.

15 Claims, 10 Drawing Sheets

APPARATUS FOR ALIGNING AND CLIPPING DIFFERENT SIZE COMPACT DISCS FOR DISC DEVICE

FIELD OF THE INVENTION

The present invention generally relates to an apparatus for aligning and clipping discs (CD/DVD) for a slot-in CD/DVD player/ROM, and more specifically to an apparatus for loading and aligning disc of different sizes into a slot-in CD/DVD player/ROM.

BACKGROUND OF THE INVENTION

Conventional slot-in CD/DVD players/ROM have convenient loading and ejection devices; therefore, they are popular and a variety of products incorporating slot-in CD/DVD players/ROM are developed, such as CD/DVD players/ROM for vehicles and notebook PC.

However, conventional slot-in CD/DVD players/ROM are usually designed for 12 cm Disc, and are not suitable for the relative newcomer, 8 cm Disc. For most of all tray-type player/ROM, it only supports 8 cm disc on horizontal-position. Tray-type will fail for 8 cm disc on vertical-position.

Although there are CD/DVD players/ROM that can load both 12 cm and 8 cm Disc, these CD/DVD players/ROM usually have complex mechanical design and an expensive price-tag. Therefore, these CD/DVD players/ROM are not widely accepted in the end-user market.

SUMMARY OF THE INVENTION

The present invention has been made to overcome the above-mentioned drawback of conventional slot-in CD/DVD players/ROM. The primary object of the present invention is to provide an aligning and clipping apparatus for slot-in CD/DVD players/ROM to load different size disc. The present invention includes a base, a tray, at least two moveable clipping elements, at least two ejection elements, and an auxiliary clipping element.

Two clipping elements are installed at the front end of the tray for loading and clipping the disc. The auxiliary clipping element is on the top of the base for improving the stability of the clipping. The ejection elements are at the two sides of the rear end of the tray for ejecting the clipping of the disc so that the disc is in the position for data reading and writing.

To achieve the function for clipping different size disc, the moveable clipping elements are placed at a specific angle and a specific curvature. Therefore, the different size disc can be clipped and held.

The present invention has a simpler design than the conventional CD/DVD player/ROM, and can load both 12 cm disc and 8 cm disc. Therefore, it is convenient for the user and provides flexibility to users of different size discs.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
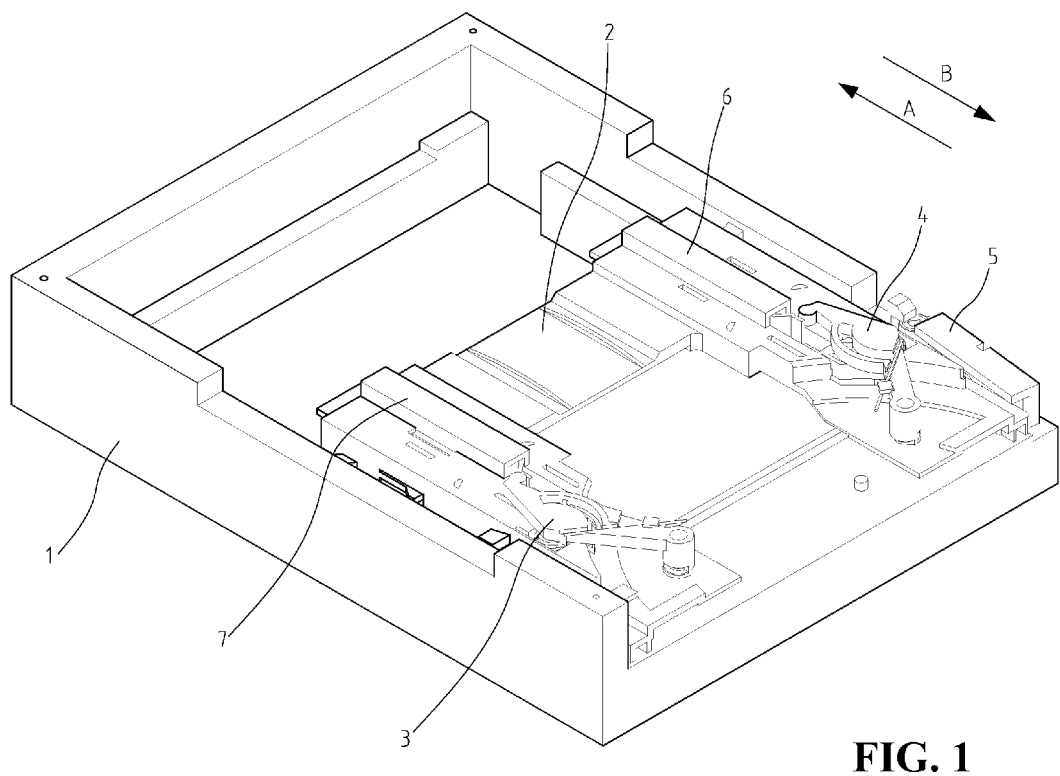
FIG. 1 shows a three-dimensional view of the disc loading apparatus without the disc.

FIG. 1 shows a three-dimensional view of the disc loading apparatus before loading the disc. The loading apparatus of the present invention includes a base 1, a tray 2, a pair of moveable clipping elements 3, 4, an auxiliary clipping element 5, and a pair of ejection elements 6, 7. The disc will be added for later explanation.

Figure 5:
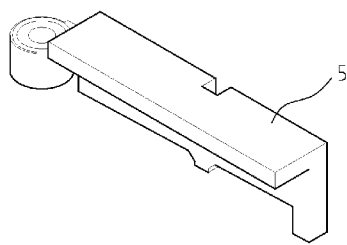
FIG. 5 shows a the-dimensional view of the auxiliary clipping element.

Auxiliary clipping element 5 is located at the front part of base 1, and the front end of auxiliary clipping element 5 is aligned to the front end of base 1. Auxiliary clipping element 5 is for improve the clipping stability during the clipping and ejection. Auxiliary clipping element 5 is shaped as an inverse-L (as shown in FIG. 5); therefore, it can fit snuggly with the rim and the top of the disc to improve the stability when the disc is clipped. When loading the disc, auxiliary clipping element 5 will turn clockwise along the rim of the disc. On the other hand, when ejecting the disc, auxiliary clipping element 5 is turning counterclockwise along the rim of the disc.

Tray 2 moves along direction A and direction inside base 1 when loading and ejection the disc. Moveable clipping elements 3, 4 are located respectively on the two sides of the front end of tray 2, as shown in FIG. 1, for clipping and aligning the disc. When different size discs are loaded, moveable clipping elements 3, 4 will react differently in order to clip and align the 8 cm or 12 cm disc precisely.

The two sides of the rear end of tray 2 include ejection elements 6, 7, respectively for ejecting moveable clipping elements 3, 4 from the disc when the disc is loaded and aligned to the position for data reading and writing. When different size discs are loaded, ejection elements 6, 7 will react differently to moveable clipping elements 3, 4 in order to align the 8 cm or 12 cm disc precisely.

The following will describe the moveable clipping elements and the ejection elements with the embodiments of 8 cm disc and 12 cm disc, respectively.

Figure 2:
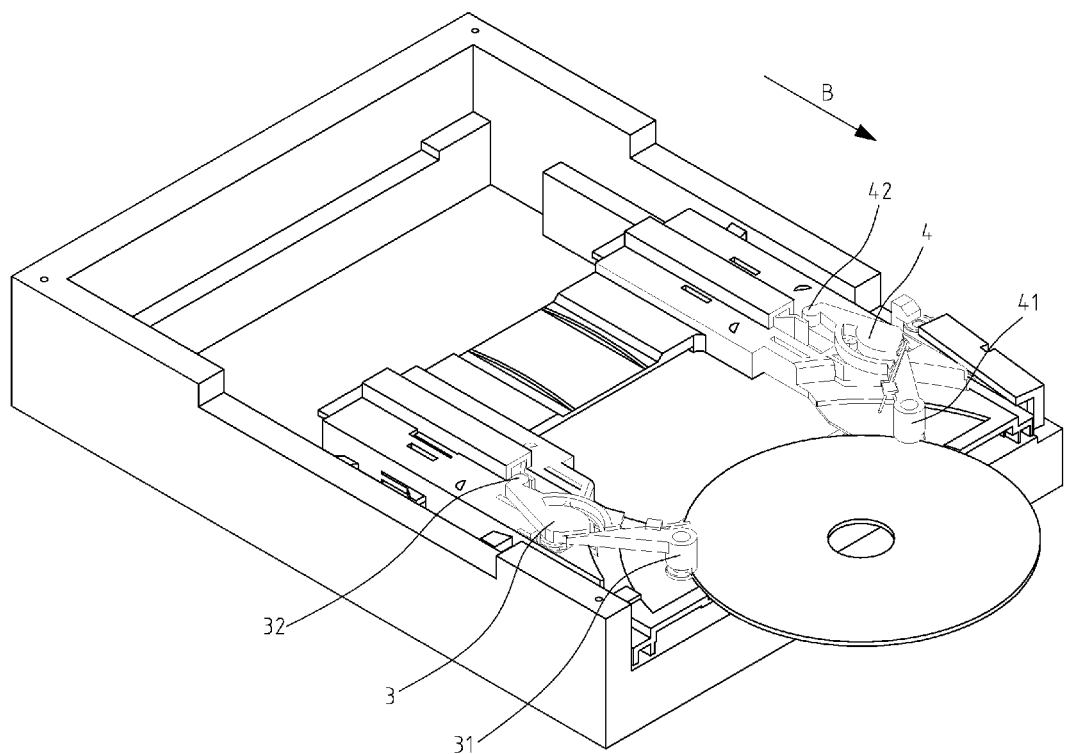
FIG. 2 shows a schematic view of the disc and the elements of the loading apparatus when disc is first loaded.
Figure 3:
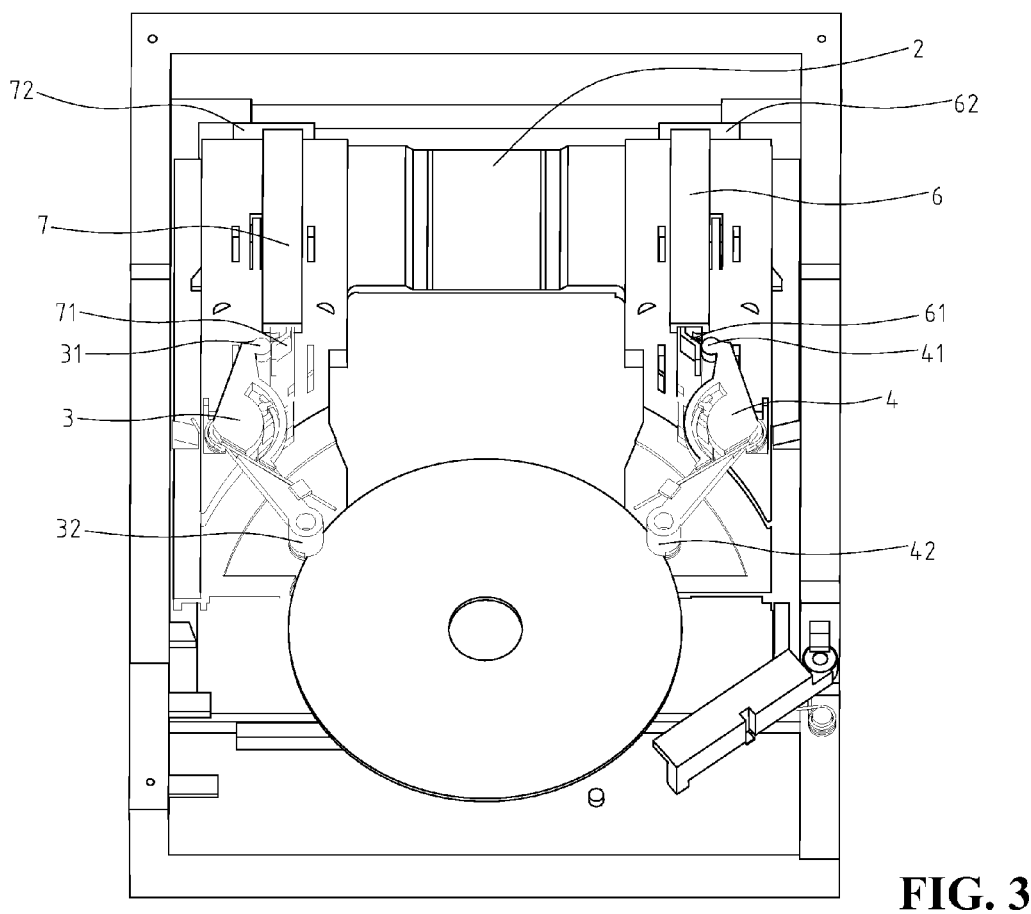
FIG. 3 shows a schematic view of the disc loading process.
Figure 4:
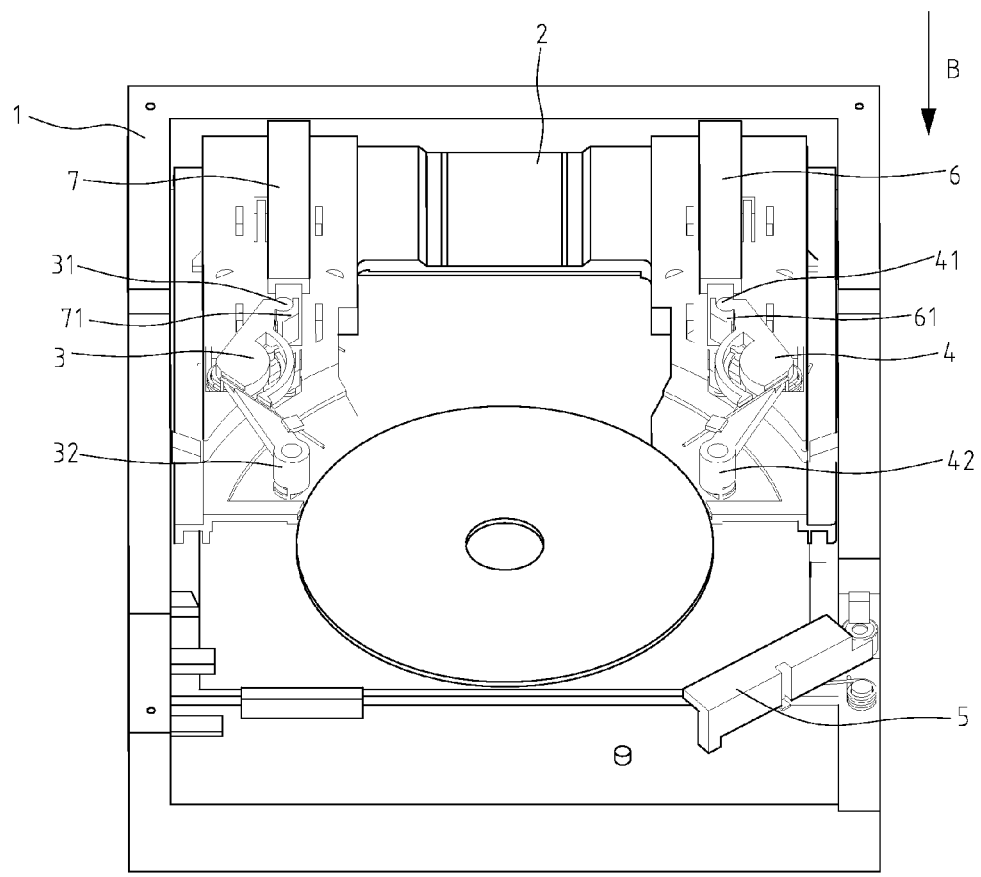
FIG. 4 shows a three-dimensional view of the fully loaded 8 cm disc and the activated ejection elements.

FIGS. 2-4 show the successive snapshots of the 8 cm disc during the loading process, including when the disc being first loaded, during the loading, and after the ejection of the clipping elements.

Figure 5A:
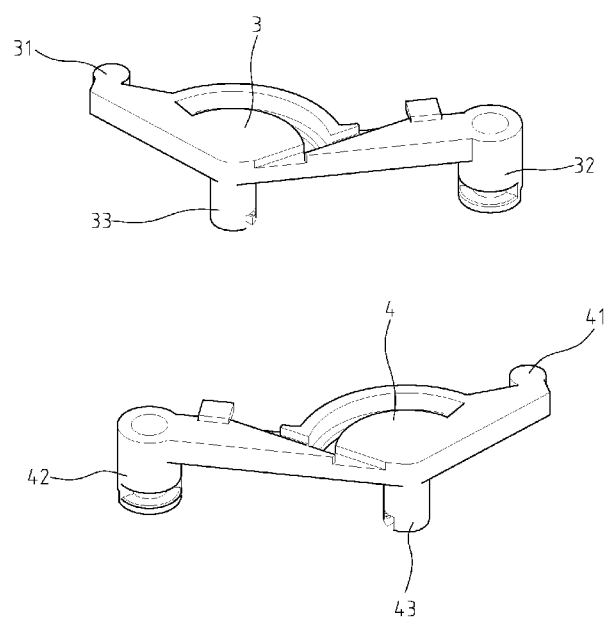
FIG. 5a shows a the-dimensional view of the trench of the moveable clipping elements.

FIG. 2 shows a schematic view of the situation when the disc is first loaded into tray 2. Moveable clipping elements 3, 4 are attached at the two sides of the front end of tray 2. Parts 3, 4 are rotary clipping elements. Moveable clipping element 3 includes a round locking pawl 31 and a carrier 32. Similarly, moveable clipping element 4 includes a round locking pawl 41 and a carrier 42. The trench openings at the front end of carriers 32, 42 (as shown in FIG. 5a) are used for clipping the disc. The thickness of the trench openings is 1.2 mm, which is the thickness of the disc. Therefore, the stability is reliable.

By slightly pushing the disc toward direction A, carrier 32 turns clockwise, and carrier 42 turns counterclockwise. At the same time, a limit switch (not shown) is activated to drag tray 2 toward direction A. Moveable clipping elements 3, 4 includes elastic elements 33, 43, respectively. The tips of elastic elements 33, 43 are attached to the sides of tray 2, and the second tips are attached to the locking pawls close to carriers 32, 42. Elastic elements 33, 43 are for maintaining the original angle of moveable clipping elements 3, 4 so that carriers 32, 42 can easily clip the disc.

FIG. 3 shows a snapshot during the loading. Ejection elements 6, 7 are a slide plate, including a Z-shaped locking pawl 61, 71 at one end, and a trigger 62, 72 at the other end. Carriers 32, 42 of moveable clipping elements 3, 4 are still clipping the disc, and round locking pawls 31, 41 are connecting Z-shaped locking pawl 71, 61, respectively. Auxiliary clipping element 5 moves along tray 2 in the clockwise direction. As the disc is 8 cm, auxiliary clipping element 5 does not perform any operation to maintain the stability.

FIG. 4 shows the activation of ejection elements for the 8 cm disc. When tray 2 reaches the inner rear end of base 1, triggers 62, 72 (not shown) uses the collision force with base 1 to move the slide plates of ejection elements 6, 7 toward direction B, and Z-shaped locking pawls 61, 71 also move toward direction B. Because round locking pawls 31, 41 are no longer touching Z-shaped locking pawls 61, 71, moveable clipping element 3 turns clockwise and moveable clipping element 4 turns counterclockwise. As moveable clipping elements 3, 4 turn in different directions, round locking pawl 31 can engage the rear end of Z-shaped locking pawl 71 in the clockwise direction and round locking pawl 41 can engage the rear end of Z-shaped locking pawl 61 in the counterclockwise direction. In the mean time, carrier 32 moves away, i.e., ejects, from the disc in the clockwise direction and carrier 42 moves away from the disc in the counterclockwise direction. The ejected carries 32, 42 form a gap from the disc so that the disc is precisely aligned to the position for data reading and writing.

Figure 6:
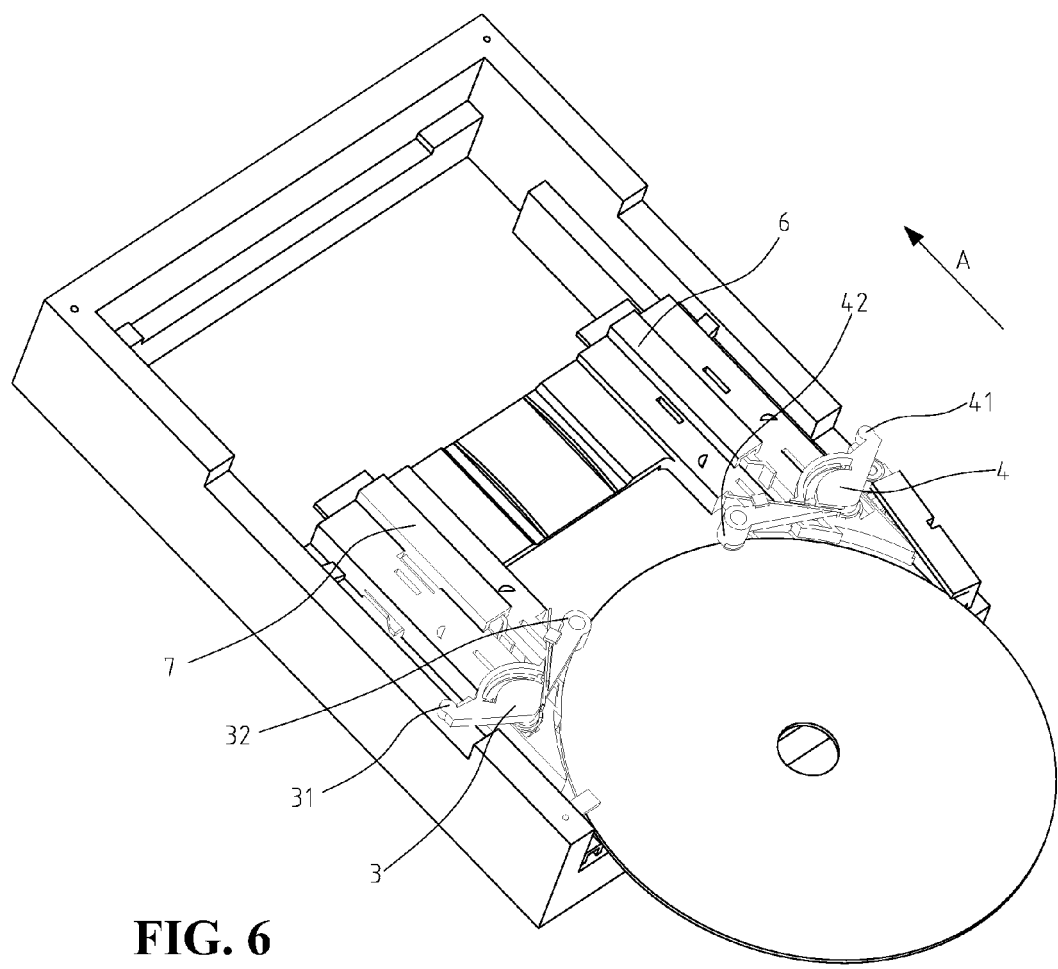
FIG. 6 shows a schematic view of a 12 cm disc when the disc is first loaded.
Figure 7:
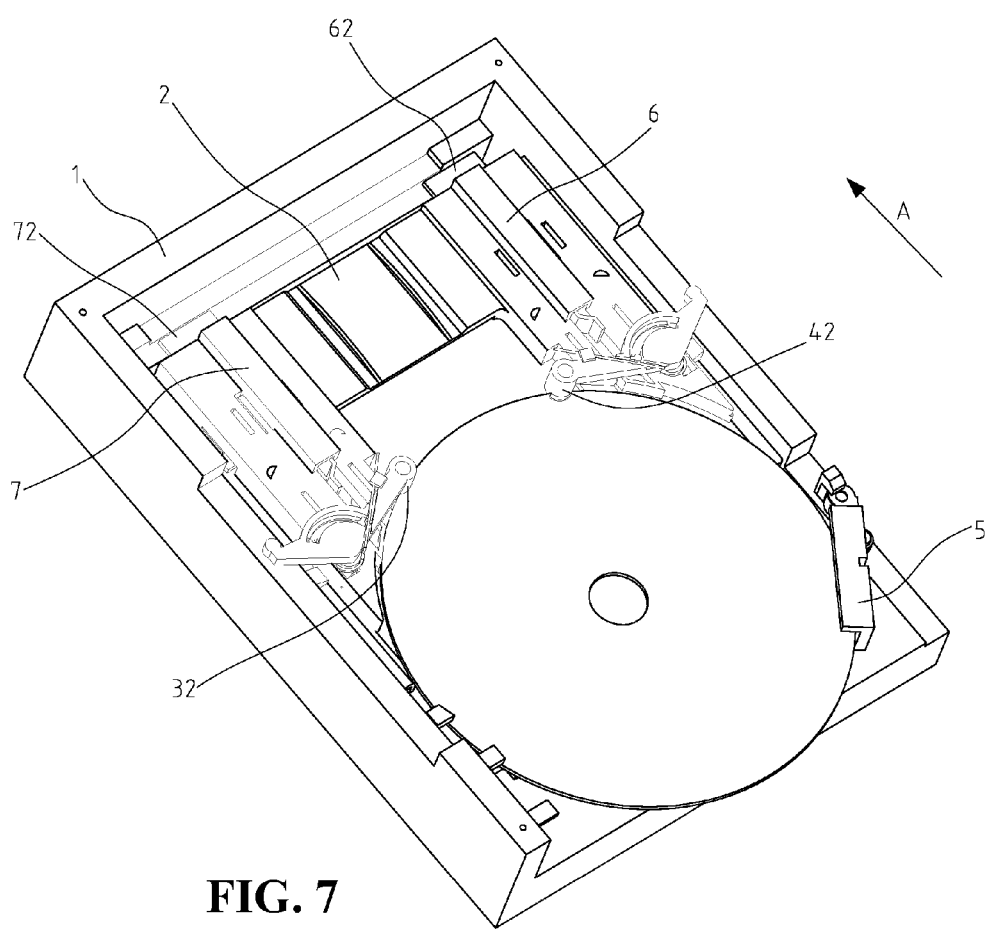
FIG. 7 shows a 12 cm disc during the loading process.
Figure 8:
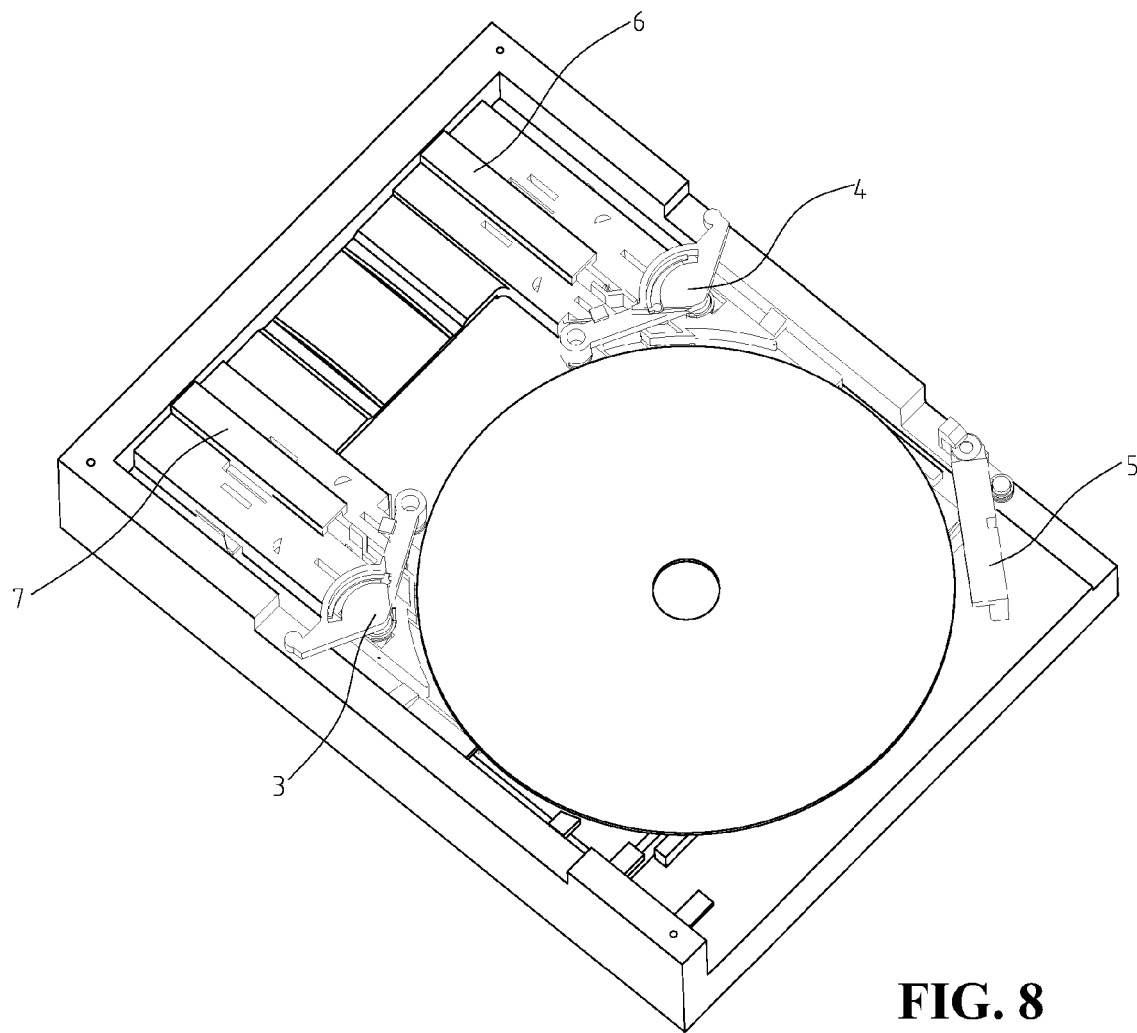
FIG. 8 shows a schematic view of the clipping elements after ejecting the disc.

The above describes the loading process for the 8 cm disc, and the following embodiment describes the loading process for the 12 cm disc, as shown in FIGS. 6-8.

Figure 9:
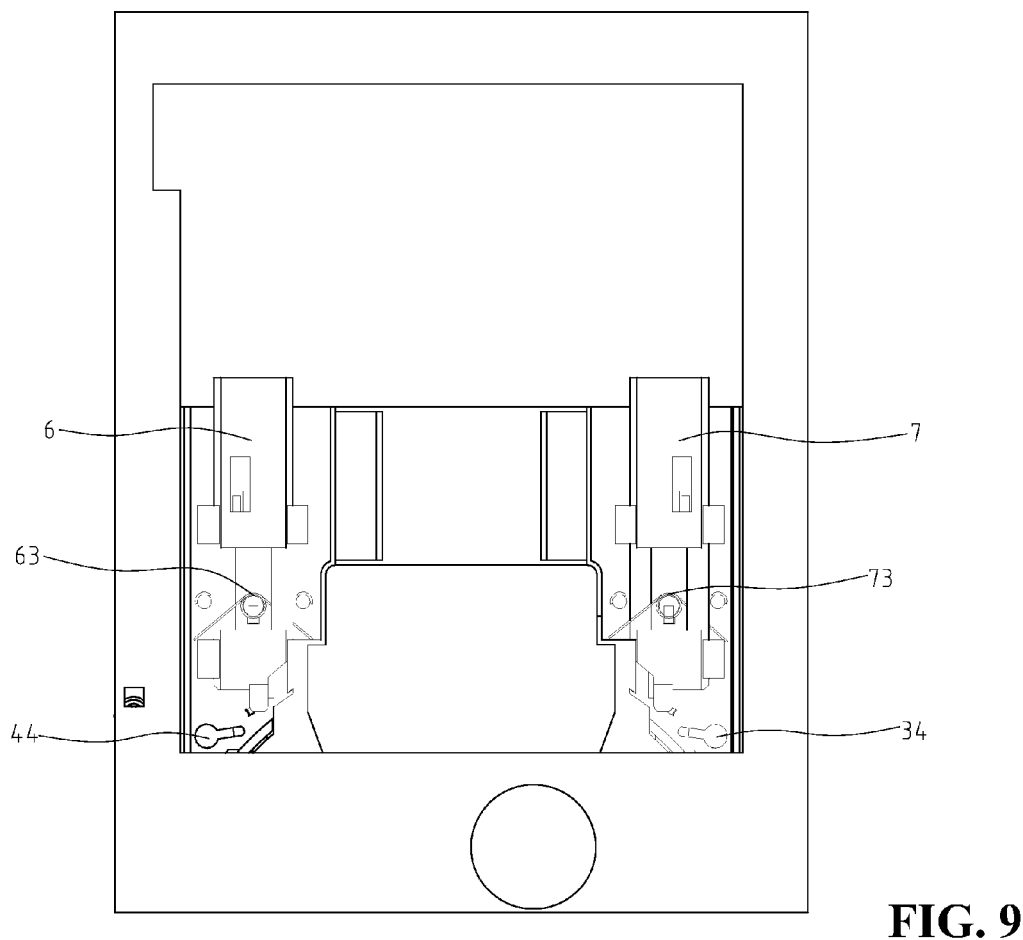
FIG. 9 shows a schematic view of the rear structure of the support element before the clipping elements turn.

FIG. 6 shows a schematic view of the situation when the 12 cm disc is first loaded into tray 2. Two support elements 34, 44, as shown in FIG. 9, that are co-axial to moveable clipping elements 3, 4, are located at the two sides of the rear of tray 2 for assuring the correct and precise operation of moveable clipping elements 3, 4.

By slightly pushing the disc toward direction A and with the curvature of the 12 cm disc, carrier 32 turns clockwise, and carrier 42 turns counterclockwise. At the same time, support elements 34, 44 co-axial to moveable clipping elements 3, 4 also turns, as shown in FIG. 10.

FIG. 7 shows a snapshot during the loading 12 cm disc. The disc on tray 2 is clipped by carrier 32, 42, and continues to move toward direction A. Auxiliary clipping element 5 moves along the rim of the disc in the clockwise direction. Ejection elements 6, 7 not only include the elements described in FIG. 3, but further include torque springs 63, 73, and push elements 64, 74. The two ends of torque springs 63, 73 are attached to the two sides of ejection elements 6, 7, respectively, and the middle points of torque springs 63, 73 are attached to the slide plates of ejection elements 6, 7. Torque springs 63, 73 exert a force in direction A to push ejection elements 6, 7 to a fixed position. The protruding tips of ejection elements 6, 7 are push elements 64, 74 for pushing the disc away from the clipping elements.

When triggers 62, 72 touch base 1 to the pre-determined extent, triggers 62, 72 activate the operation of ejection elements 6, 7 to eject all the clipping elements away from the disc. FIG. 8 shows the activation of ejection elements for the 12 cm disc. When ejection elements 6, 7 are activated, auxiliary clipping element 5 turns away from the disc in the counterclockwise direction. However, moveable clipping elements 3, 4 do not perform any disc ejection operation, which are accomplished by ejection elements 6, 7.

Figure 10:
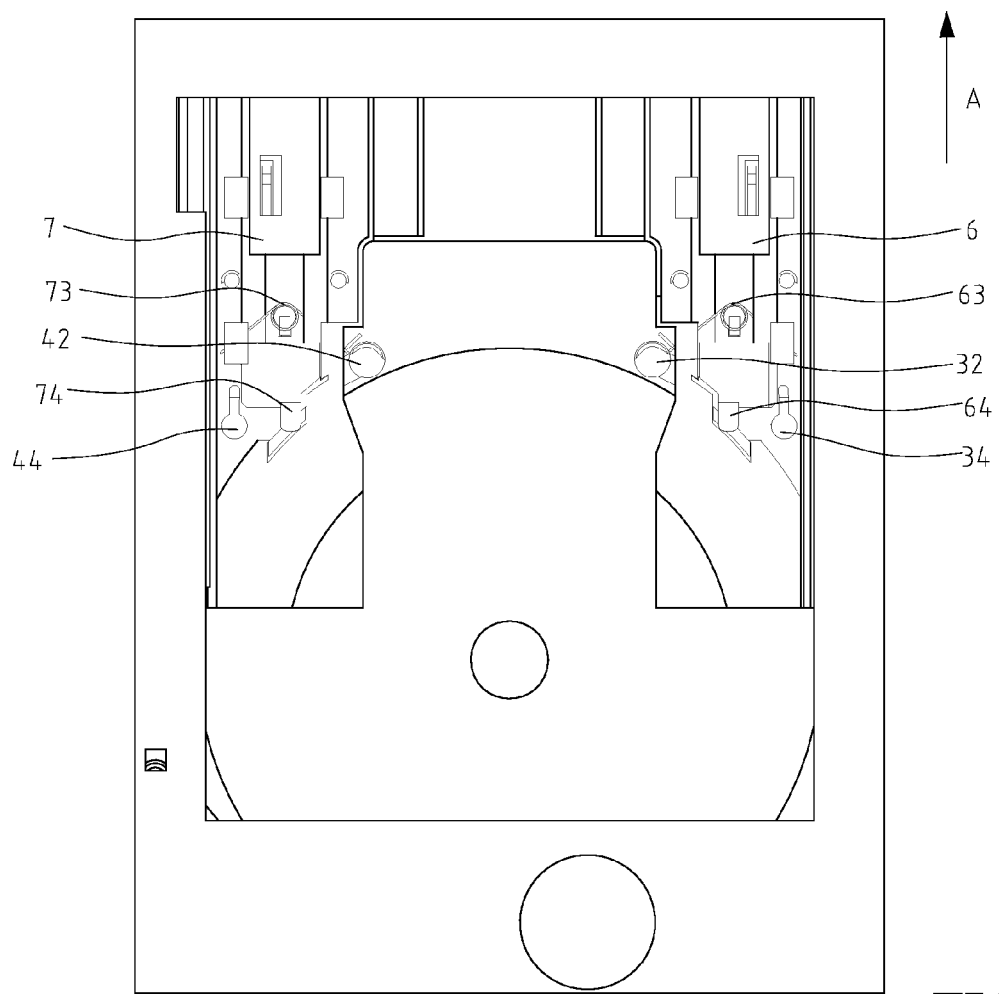
FIG. 10 shows a schematic view of the rear structure of the support element after the clipping elements turn.

FIG. 10 shows a schematic view of the rear structure after the ejection elements are activated. The slide plates of ejection elements 6, 7 are pushed by torque springs 63, 73 towards direction B to a fixed position. Ejection elements engage support elements 34, 44 to prevent from springing back while pushing push elements 64, 74 of ejection elements 6, 7 to push the disc from the trench of carriers 32, 42. This accomplishes the disc ejection from the clipping elements and aligns the disc to the precise position for data reading and writing.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A clipping and aligning apparatus for loading discs of different sizes into a CD/DVD player/ROM and devices with a disc loading mechanism, comprising:

a base;

a tray, moving along a straight line inside said base;

at least two moveable clipping elements, located at two sides of said tray for clipping said disc, each said moveable clipping element further comprising: a carrier, a round locking pawl, a support element and an elastic element;

at least two ejection elements, located at two sides of said tray for ejecting said disc from said moveable clipping elements and aligning said disc, each said ejection element further comprising a long slide plate with a first end as a trigger and a second end as a Z-shaped locking pawl, a push element and a torque spring; and at least an auxiliary clipping element, located at said base for improving clipping stability.

2. The apparatus as claimed in claim 1, wherein said tray moves inside said base following a track.

3. The apparatus as claimed in claim 1, wherein said auxiliary clipping element is a moveable element.

4. The apparatus as claimed in claim 1, wherein said carrier comprises a trench.

5. The apparatus as claimed in claim 1, wherein said carrier is at one end of said carrier, and said round locking pawl is at the other end of said moveable clipping element connecting said Z-shaped locking pawl.

6. The apparatus as claimed in claim 1, wherein said elastic element is on the front surface of said moveable clipping element, and said support element is on the rear surface of said moveable clipping element.

7. The apparatus as claimed in claim 1, wherein said support element of said moveable clipping element and said moveable clipping element are coaxially engaged.

8. The apparatus as claimed in claim 1, wherein said support element stops said slide plate of said ejection element when said disc reaches the correct position.

9. The apparatus as claimed in claim 1, wherein said support elements fixes said moveable clipping element when said ejection element is activated.

10. The apparatus as claimed in claim 1, wherein said elastic spring has one end attached to said tray and the other end attached to said moveable clipping element.

11. The apparatus as claimed in claim 1, wherein said round locking pawl of said moveable clipping element is connected to said Z-shaped locking pawl of said ejection element.

12. The apparatus as claimed in claim 1, wherein the two ends of said torque spring are fixed at said tray and the middle point of said torque spring is fixed at said slide plate.

13. The apparatus as claimed in claim 1, wherein said torque spring exerts a force to move said slide plate towards inside of said base.

14. The apparatus as claimed in claim 1, wherein said trigger is for activating ejection element when said tray is close to said base within a pre-determined range.

15. The apparatus as claimed in claim 1, wherein said push element pushes said disc to the correct position.

* * * * *